United States Patent
Hua et al.

(10) Patent No.: US 9,143,462 B2
(45) Date of Patent: Sep. 22, 2015

(54) LARGE SEND SUPPORT IN LAYER 2 SWITCH TO ENHANCE EFFECTIVENESS OF LARGE RECEIVE ON NIC AND OVERALL NETWORK THROUGHPUT

(75) Inventors: Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 12/421,731

(22) Filed: Apr. 10, 2009

(65) Prior Publication Data

US 2010/0260186 A1     Oct. 14, 2010

(51) Int. Cl.
*H04L 12/933*     (2013.01)

(52) U.S. Cl.
CPC ...................................... *H04L 49/10* (2013.01)

(58) Field of Classification Search
CPC ........................................................ H04L 49/10
USPC .................................. 370/394, 238, 389, 411
See application file for complete search history.

(56) References Cited

U.S. PATENT DOCUMENTS

| | | | |
|---|---|---|---|
| 6,246,684 B1* | 6/2001 | Chapman et al. | 370/394 |
| 6,925,055 B1 | 8/2005 | Erimli et al. | |
| 6,925,078 B1* | 8/2005 | Sherer et al. | 370/389 |
| 7,283,483 B2 | 10/2007 | Asawa et al. | |
| 2003/0225892 A1* | 12/2003 | Takusagawa et al. | 709/227 |
| 2004/0047361 A1* | 3/2004 | Fan et al. | 370/411 |
| 2006/0227811 A1* | 10/2006 | Hussain et al. | 370/503 |
| 2007/0047563 A1 | 3/2007 | Shvodian | |
| 2007/0121511 A1* | 5/2007 | Morandin | 370/235 |
| 2008/0095167 A1* | 4/2008 | Bruss | 370/394 |
| 2008/0159150 A1* | 7/2008 | Ansari | 370/238 |

FOREIGN PATENT DOCUMENTS

JP     2001134524     5/2001

OTHER PUBLICATIONS

Kostic, Dejan, et al., "Bullet: High Bandwidth Data Dissemination Using an Overlay Mesh"; SOSP '03, Oct. 19-22, 2003, pp. 282-297; Bolton Landing, New York, USA.

Brown, Jeremy, et al., "A Lightweight Idempotent Messaging Protocol for Faulty Networks"; SPAA '02, Aug. 10-13, 2002; pp. 248-257; Winnipeg, Manitoba, Canada.

* cited by examiner

*Primary Examiner* — Man Phan
*Assistant Examiner* — Mandish Randhawa
(74) *Attorney, Agent, or Firm* — DeLizio Law, PLLC

(57) ABSTRACT

The present disclosure is directed to a method for delivering a plurality of packets from a network switch to a receiving node. The method may comprise collecting a plurality of packets received at the network switch during a time window; arranging the plurality of packets based on a source address, a package number, and a destination address for each one of the plurality of packets collected during the time window; and delivering the arranged plurality of packets to the receiving node.

15 Claims, 3 Drawing Sheets

200

| 202 Collecting a plurality of packets received at the network switch during a time window |

| 204 Arranging the plurality of packets based on at least one of a source address, a package number, and a destination address for each one of the plurality of packets |

| 206 Delivering the arranged plurality of packets to the receiving node |

LARGE SEND SUPPORT IN LAYER 2 SWITCH TO ENHANCE EFFECTIVENESS OF LARGE RECEIVE ON NIC AND OVERALL NETWORK THROUGHPUT

TECHNICAL FIELD

The present disclosure generally relates to the field of computer networking, and more particularly to a method for delivering a plurality of packets from a network switch to a receiving node.

BACKGROUND

A Network Interface Card (NIC) may be configured to support large segment offload (LSO, may also be known as "large send" or "Transmission Control Protocol (TCP) segmentation"). LSO is a technique for increasing outbound throughput of network connections by reducing processor (e.g., Central Processing Unit (CPU)) overhead. For example, LSO may allow the host to send a large TCP segment (typically 64 KB) to the NIC, and the NIC may break down the segment into Ethernet frames with configured maximum transmission unit (MTU) size. Similarly, large receive offload (LRO, may also be known as "large receive option" or "TCP segment reassembly") may also be supported by a NIC for optimizing received traffic. However, the received traffic may be interleaved between several connections, and a switch (e.g., a Layer 2 switch) may forward the traffic in the same order as they were received.

SUMMARY

The present disclosure is directed to a method for delivering a plurality of packets from a network switch to a receiving node. The method may comprise collecting a plurality of packets received at the network switch during a time window; arranging the plurality of packets based on a source address, a package number, and a destination address for each one of the plurality of packets collected during the time window; and delivering the arranged plurality of packets to the receiving node.

A further embodiment of the present disclosure is directed to a network switch. The network switch may comprise a buffer for collecting a plurality of packets received at the network switch during a time window; a packet arranging module for arranging the plurality of packets based on a source address, a package number, and a destination address for each one of the plurality of packets collected during the time window; and a port for delivering the arranged plurality of packets to a receiving node.

A further embodiment of the present disclosure is directed to a computer-readable medium having computer-executable instructions for performing a method for delivering a plurality of packets from a network switch to a receiving node. The method may comprise collecting a plurality of packets received at the network switch during a time window; arranging the plurality of packets based on a source address, a package number, and a destination address for each one of the plurality of packets collected during the time window; and delivering the arranged plurality of packets to the receiving node.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Large receive offload (LRO, may also be known as "large receive option" or "TCP segment reassembly") is a technique for increasing inbound throughput of network connections by reducing CPU overhead. LRO may aggregate multiple incoming packets into a larger buffer before they are passed higher up the networking stack, thus reducing the number of packets that have to be processed. Since the received traffic may be interleaved between several connections, a switch (e.g., a Layer 2 switch) may forward the traffic in the same order as they were received.

The present disclosure is directed to a method for facilitating a Layer 2 Ethernet switch for ordering the received segments/frames. The method may enable the Layer 2 Ethernet switch to forward several frames from a given connection to the next node higher up on the networking stack. Utilizing the method of the present disclosure, the receiving node may receive multiple packets for the same connection in sequence, therefore, improving the LRO efficiency of the receive node. The method may utilize a coalesce logic, which buffers the received packets within a predetermined time window and reorders the packets so that they are contiguous from a given connection within the time window. The time window may be optimized appropriately for latency and coalescence. The method may minimize interrupt overhead and increase the PCI bus efficiency of the receiving node.

Figure 1:
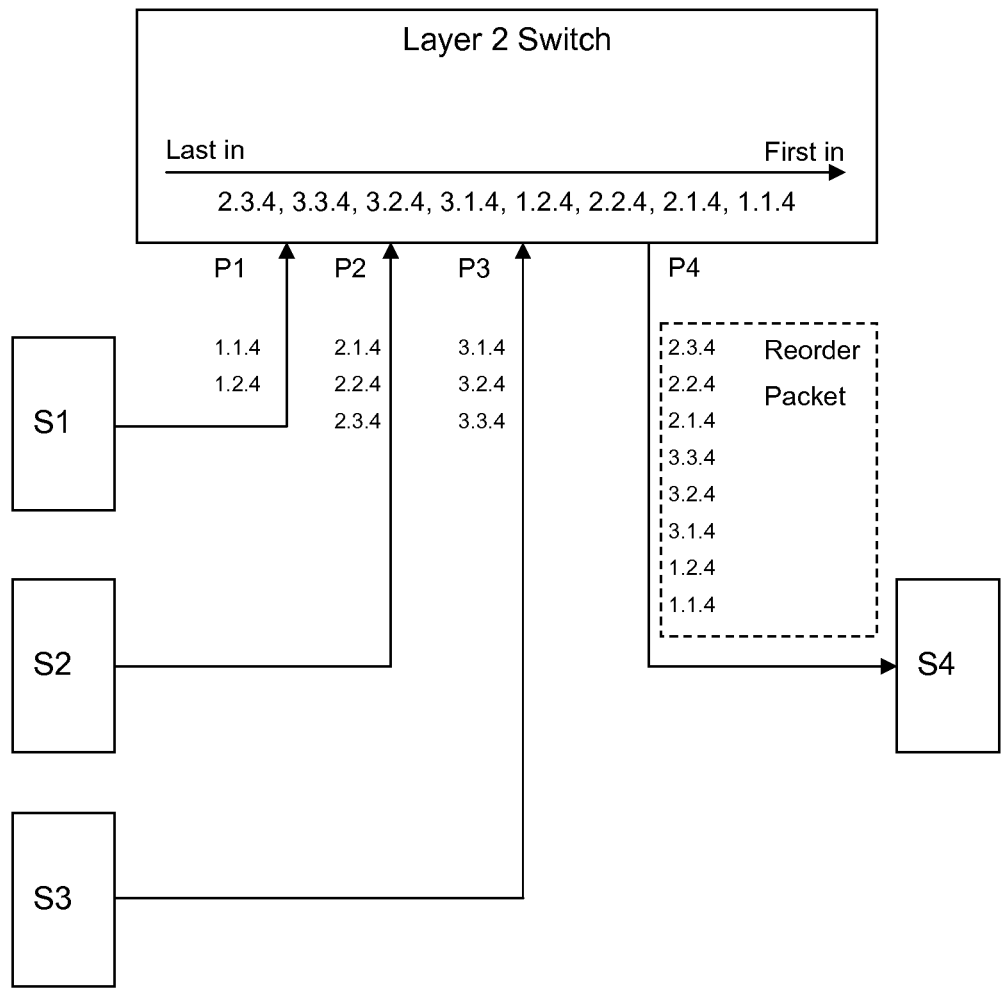
FIG. 1 is an exemplary network traffic flow on a subnet.

Referring now to FIG. 1, there is shown an exemplary network traffic flow on a subnet. In this example, servers S1, S2, S3 and S4 are on the same subnet. Servers S1, S2 and S3 may send data packets to S4. Each data packet may comprise packet control information (e.g., information presented in the header or trailer of the packet) indicating the source, destination and packet number. A simplified notation representing such control information is utilized in FIG. 1 for illustration purposes. The first digit (1.X.X) may denote the interface number, the second digit (X.1.X) may represent the packet number, and the third digit (X.X.4) may denote the destination interface. For example, 1.1.4 may represent that packet 1 is sourced from interface 1 and destined to interface 4. It is understood that different notations and/or representations of the packet control information may be utilized without departing from the spirit of the present disclosure.

The data flow of the subnet at a particular time instance is depicted in FIG. 1. As illustrated, the packets received at the Layer 2 switch may be interleaved due to multiple source servers. Without ordering of the received packets, the switch may transfer the packets in a first-in-first-out (FIFO) order. In such a configuration, the receiving server S4 may receive the data packets in an interleaved manner (e.g., 1.1.4, 2.1.4, 2.2.4, . . . , 2.3.4).

The present disclosure may reorder the received packets. In one embodiment, the method of the present disclosure rearranges the packets in such a way that the packets may be contiguous for a given connection. For instance, the Layer 2 switch may define a time window for receiving a plurality of data packets. Upon termination of the time window, the Layer 2 switch may sort the data packets received during the time window based on the source interface, the packet number, and the destination interface. For the example depicted in FIG. 1, the rearranged packets may be presented to the receiving server S4 in the following order: 1.1.4, 1.2.4, 3.1.4, 3.2.4, 3.3.4, 2.1.4, 2.2.4, 2.3.4.

It is contemplated that a timer may be utilized for determining the time window (may be referred to as coalescing period) to optimize for latency and effectiveness of coalescing. A larger time window may provide a higher coalescence with a greater latency, while a smaller time window may provide a lower coalescence with a smaller latency. The time window may be adjustable/configurable systematically or by an operator for a given application based on throughput and/or latency requirements of the given application.

Figure 2:
FIG. 2 is a flow diagram illustrating a method for delivering a plurality of packets from a network switch to a receiving node.
Figure 2:

FIG. 2 shows a flow diagram illustrating steps performed by a method 200 in accordance with the present disclosure. The method 200 may be utilized for delivering a plurality of packets from a network switch to a receiving node. In one embodiment, step 202 may collect a plurality of packets received at the network switch during a time window. The collected packets may be stored in a memory or buffer.

Step 204 may arrange the plurality of packets collected during the time window. The arrangement may be based on source address, package number, and/or destination address for each one of the plurality of packets. For example, the collected packets may be arranged in a manner such that multiple packets sent from the same source to be delivered to the same destination may be arranged together in the order specified in the packet numbers. Step 206 may deliver the plurality of packets to the receiving node in the arranged order.

Figure 3:
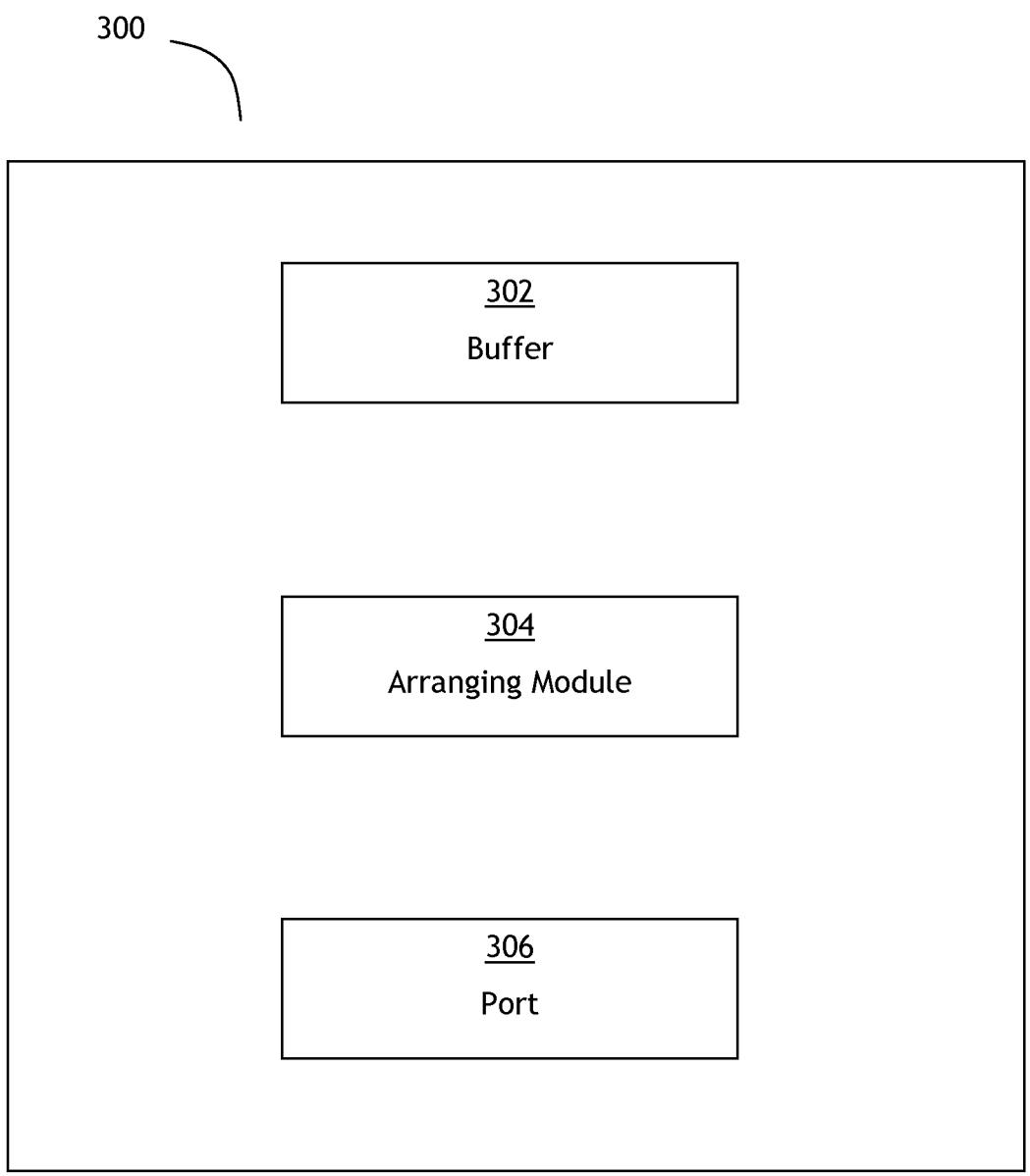
FIG. 3 is a block diagram illustrating a network switch for delivering a plurality of packets from a network switch to a receiving node.

Referring to FIG. 3, a block diagram illustrating a network switch 300 for delivering a plurality of packets from a network switch to a receiving node is shown. The network switch 300 may comprise at least one memory/buffer 302 for collecting a plurality of packets received at the network switch during a time window. The network switch 300 may also comprise a packet arranging module 304 for arranging the plurality of packets. The packets may be arranged based on at least one of a source address, a package number, and a destination address for each one of the plurality of packets. The arranged packets may be delivered to the receiving node through an interface provided by at least one port 306 available on the network switch 300.

In the present disclosure, the methods disclosed may be computer program products for facilitating a network switch to deliver received packets. A computer program product may comprise a computer usable storage medium having computer usable program code stored thereon tangibly embodied therewith. Examples of computer usable storage medium having computer usable program code stored thereon include computer readable storage devices such as a recordable type medium such as a floppy disk, a hard disk drive, a Compact Disc (CD), a Digital Video Disk (DVD), a digital tape, a computer memory, conventional computer system RAM (random access memory), ROM (read only memory), EPROM (erasable, programmable ROM), EEPROM (electrically erasable, programmable ROM), flash memory, and magnetic or optical disks or tapes.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for delivering a plurality of packets from a network switch to a receiving node, comprising:
   collecting a plurality of packets, from different sources having different source addresses, received at the network switch during a time window;
   storing the plurality of packets into a buffer that is shared among the plurality of packets having different source addresses;
   arranging the plurality of packets based on a source address, a packet number, and a destination address for each one of the plurality of packets collected during the time window, wherein the destination address is the address of the receiving node, and wherein the arranging of the plurality of packets comprises,
      arranging the plurality of packets so that packets of the plurality of packets having a common source address of the different source addresses are contiguous in an order of the plurality of packets; and
      arranging the packets having the common source address according to an order specified in the packet numbers for the packets; and
   delivering the arranged plurality of packets to the receiving node.

2. The method as claimed in claim 1, wherein the time window is adjustable.

3. The method as claimed in claim 1, wherein the network switch is a Layer 2 switch.

4. The method as claimed in claim 1, wherein at least two of the plurality of packets are sent from a common source address and to be delivered to a common destination address, the at least two of the plurality of packets are arranged together according to an order specified in the packet numbers for the at least two of the plurality of packets.

5. The method as claimed in claim 1, wherein a total size of the plurality of packets collected is equal to or greater than a Maximum Transmission Unit (MTU) size.

6. A network switch, comprising
   a buffer for collecting a plurality of packets, from different sources having different source addresses, received at the network switch during a time window;
   a packet arranging module for arranging the plurality of packets based on a source address, a packet number, and a destination address for each one of the plurality of packets collected during the time window, wherein the destination address is the address of the receiving node and wherein as part of the arranging of the plurality of packets, the packet arranging module is configured to,
    arrange the plurality of packets so that packets of the plurality of packets having a common source address are contiguous in an order of the plurality of packets; and
    arrange the packets having the common source address according to an order specified in the packet numbers for the packets; and
a port for delivering the arranged plurality of packets to a receiving node.

7. The network switch as claimed in claim 6, wherein the time window is adjustable.

8. The network switch as claimed in claim 6, wherein the network switch is a Layer 2 switch.

9. The network switch as claimed in claim 6, wherein at least two of the plurality of packets are sent from a common source address and to be delivered to a common destination address, the at least two of the plurality of packets are arranged together according to an order specified in the packet numbers for the at least two of the plurality of packets.

10. The network switch as claimed in claim 6, wherein a total size of the plurality of packets collected is equal to or greater than a Maximum Transmission Unit (MTU) size.

11. A non-transitory computer-readable storage medium having computer-executable instructions for performing a method for delivering a plurality of packets from a network switch to a receiving node, comprising: collecting a plurality of packets, from different sources having different source addresses, received at the network switch during a time window; storing the plurality of packets into a buffer that is shared among the plurality of packets having different source addresses; arranging the plurality of packets based on a source address, a packet number, and a destination address for each one of the plurality of packets collected during the time window, wherein the destination address is the address of the receiving node, and wherein the arranging of the plurality of packets comprises, arranging the plurality of packets so that packets of the plurality of packets having a common source address of the different source addresses are contiguous in an order of the plurality of packets; and arranging the packets having the common source address according to an order specified in the packet numbers for the packets; and delivering the arranged plurality of packets to the receiving node.

12. The non-transitory computer-readable storage medium as claimed in claim 11, wherein the time window is adjustable.

13. The non-transitory computer-readable storage medium as claimed in claim 11, wherein the network switch is a Layer 2 switch.

14. The non-transitory computer-readable storage medium as claimed in claim 11, wherein at least two of the plurality of packets are sent from a common source address and to be delivered to a common destination address, the at least two of the plurality of packets are arranged together according to an order specified in the packet numbers for the at least two of the plurality of packets.

15. The non-transitory computer-readable storage medium as claimed in claim 11, wherein a total size of the plurality of packets collected is equal to or greater than a Maximum Transmission Unit (MTU) size.

\* \* \* \* \*